United States Patent Office 2,775,564
Patented Dec. 25, 1956

2,775,564
PROCESS FOR MANUFACTURE OF STRONGLY BASIC ANION EXCHANGERS

Geert J. de Jong, Geleen, Netherlands, assignor to Stamicarbon N. V., Heerlen, Netherlands No Drawing. Application October 26, 1953, Serial No. 388,439

Claims priority, application Netherlands November 8, 1952

2 Claims. (Cl. 260—2.1)

My invention relates to new compositions of matter which have been found to have exceptional properties as strongly basic anion exchangers and to have advantages in this connection over compounds used hitherto.

My invention further relates to preferred processes for the preparation of the said new compositions of matter.

My invention also relates to an improved method of exchanging anions, especially silicic acid ions, from solutions wherein the said new compositions of matter are employed as anion exchanger.

An important object of my invention is to provide said new compositions of matter in a special form, especially suited for anion exchanging purposes or for use as selective membranes in electrolysis or electrodialysis.

A further object of my invention is to provide anion exchangers which, apart from being insoluble in water, alkaline lye and acid, are alkali-resistant and may be easily regenerated without losing capacity.

Other objects will appear hereinafter and in the appertaining claims.

It was already known that strongly basic anion exchangers may be obtained by introducing quaternary ammonium groups into artificial resins. Furthermore, copending patent application No. 300,115 describes strongly basic anion exchangers the activity of which is due to the presence of tertiary sulphonium groups.

I found that a strongly basic anion exchanger may also be obtained by preparing an insoluble, macromolecular organic matrix carrying quaternary phosphonium groups and although monomeric quaternary phosphonium compounds are not very stable in general because in the basic form a hydrocarbon is easily split off according to the equation:

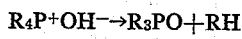

$$R_4P^+OH^- \rightarrow R_3PO + RH$$

(where R represents a hydrocarbon radical), the macromolecular products appear to have a sufficient degree of stability for use as strongly basic anion exchangers.

The new compositions of matter will be described herein mainly in connection with their properties as strongly basic anion exchangers, but I believe the compounds are new per se and as such may have other uses.

The new composition of matter according to my invention consists of or comprises an insoluble macromolecular organic matrix carrying quaternary phosphonium groups. The quaternary phosphonium groups may be tetra-aryl, alkyl triaryl, dialkyldiaryl, trialkylaryl or tetra-alkyl groups, or alternatively the quaternary phosphonium groups may contain one or more aralkyl groups or alkoxy aryl groups.

The preparation of these products may be carried out in various ways. Thus, a suitable low molecular quaternary phosphonium compound may be converted into macromolecular products by a polymerisation reaction or a poly-condensation reaction with other substances. Conveniently, according to my invention, a quaternary phosphonium salt may be condensed with formaldehyde in the presence of concentrated sulphuric acid, the said salt containing at least one aryl group having a substituent capable of promoting cationoid substitution, for example, the substituted aryl group may be an alkoxy phenyl group.

Alternatively, the macromolecular compound may be prepared by introducing quaternary phosphonium groups into a macromolecular organic compound, for instance, by treating a macromolecular compound containing phosphine groups with an alkylating, aralkylating or arylating agent.

Examples of phosphonium compounds suitable for polymerisation or polycondensation are the product obtained from trianisyl phosphine by a treatment with an alkylating agent such as dimethyl sulphate, and a tetraalkoxy phenyl phosphonium compound which may be obtained from a trialkoxy phenyl phosphine and an alkoxy phenyl magnesium bromide in the presence of air.

Other suitable products are obtained by starting from a tetra-aryl phosphonium compound, one or two aryl groups of which carry alkoxy groups, the other aryl groups being non-substituted phenyl nuclei or phenyl nuclei substituted only by alkyl groups.

Those low molecular quaternary phosphonium compounds, and others, which contain at least one aryl group bound to the phosphorus atom may be converted, by polycondensation with an aldehyde, such as formaldehyde, under the influence of a condensing agent, such as concentrated sulphuric acid, into a macromolecular product which is insoluble in water, alkali and acid.

If the condensation products obtained are not sufficiently firm i. e., if the degree of polymerisation of the macromolecular products obtained is not high enough they may be subjected to further polymerisation or polycondensation reactions. A substance which is trivalent or polyvalent with respect to the condensation reaction with formaldehyde may be added, so that the linear polymers can be rendered insoluble by cross linkages.

When preparing the products according to my invention by starting from existing macromolecular compounds and forming quaternary phosphonium groups therein, the macromolecular compound should contain groups which are easily convertible into quaternary phosphonium groups. By way of example I may mention macromolecular compounds containing phosphine groups. By a treatment with an alkylating, arylating or arylkylating agent these compounds may be converted into products having the desired quaternary phosphonium groups preferably after breaking up the initial compound into a suitably subdivided form.

Of special technical importance is the preparation of my new products in pellet form by carrying out the polymerisation or polycondensation reaction in which the intermediate or the final product is formed in such a manner that drops are formed by distributing the reaction components e. g., whilst stirring, in an inert liquid vehicle, in which neither the starting products nor the final product are soluble. The specific gravity of this liquid should preferably be equal to or slightly lower than the specific gravity of the dispersed drops.

The new compounds may also be obtained in the form of sheets, plates, foils or differently shaped products, by the application of techniques known in themselves, such as casting or moulding. By way of illustration and not of limitation, my invention will be elucidated with the help of the following practical examples.

Example 1

60 grams of powdery, crude, light yellow trianisyl phosphine, prepared by reacting anisyl magnesium bromide with phosphorus trichloride, is slowly stirred into 60 grams of dimethyl sulphate while cooling. The phosphine dissolves and a viscous liquid is formed, a considerable amount of heat being developed in the process.

Subsequently a solution of 10 grams of para-formaldehyde in 50 grams of concentrated sulphuric acid is added whilst stirring and cooling. The viscosity rises slowly, the reacting mixture remaining transparent. After a gel has formed a heating treatment at a temperature between 50 and 60° C. is carried out for about 30 minutes. The resulting solid product is broken and the acid washed out. In this way 200 ml. of a transparent and very light coloured resin are obtained. After a treatment with alkali this product is capable of converting neutral salts into hydroxides and of completely removing silicic acid from water. For silicic acid the capacity amounted to about 400 m-equivalent per litre. When applied as a silicic acid retainer the capacity of the product appeared to diminish to some extent in the first few weeks, after which it became more constant.

*Example 2*

Starting from tetra anisyl phosphonium chloride, prepared by reacting trianisyl phosphine with anisyl magnesium bromide in the presence of oxygen and converting the resulting acid magnesium compound into the chloride, a resin may be obtained in the manner described in Example 1 which has properties analogous to those of the resin described in Example 1. The stability in the basic form appeared to be greater.

I claim:
1. A process which comprises polycondensing a methyl tri (methoxy phenyl) phosphonium salt with formaldehyde in the presence of concentrated sulphuric acid.
2. A process for the manufacture of a water insoluble resinous product having strongly basic anion exchanging properties, which comprises reacting a methyl tri (methoxyphenyl) phosphonium salt with formaldehyde in the presence of concentrated sulfuric acid to obtain a resin and subsequently washing the resulting resin with alkali.

References Cited in the file of this patent

UNITED STATES PATENTS

| | | |
|---|---|---|
| 2,102,103 | Urbain et al. | Sept. 14, 1937 |
| 2,234,548 | Brannon | Mar. 11, 1941 |
| 2,521,288 | Evers | Sept. 5, 1950 |
| 2,531,427 | Hauser | Nov. 28, 1950 |
| 2,543,666 | Michael | Feb. 27, 1951 |
| 2,597,494 | Hwa | May 20, 1952 |
| 2,630,427 | Hwa | Mar. 3, 1953 |

FOREIGN PATENTS

| | | |
|---|---|---|
| 225,104 | Switzerland | May 1, 1943 |
| 829,498 | Germany | Jan. 28, 1952 |